(12) United States Patent
Shaham et al.

(10) Patent No.: US 9,113,115 B2
(45) Date of Patent: Aug. 18, 2015

(54) COLOR IMAGE DATA COMPRESSION

(75) Inventors: Noam Shaham, Mazkeret Batia (IL);
Gideon Amir, Ness Ziona (IL); Ram Dagan, Modiin (IL); Michael Melamed, Tel-Aviv (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 377 days.

(21) Appl. No.: 13/556,198

(22) Filed: Jul. 24, 2012

(65) Prior Publication Data

US 2014/0029024 A1    Jan. 30, 2014

(51) Int. Cl.
*G06K 9/36* (2006.01)
*H04N 1/64* (2006.01)

(52) U.S. Cl.
CPC ..................... *H04N 1/644* (2013.01)

(58) Field of Classification Search
None
See application file for complete search history.

(56) References Cited

U.S. PATENT DOCUMENTS

| | | | |
|---|---|---|---|
| 5,553,160 A | 9/1996 | Dawson | |
| 5,625,759 A * | 4/1997 | Freeman | 358/1.15 |
| 5,883,633 A | 3/1999 | Gill | |
| 6,707,939 B1 * | 3/2004 | Weinholz et al. | 382/164 |
| 8,150,147 B2 * | 4/2012 | Tamura | 382/162 |
| 2003/0021471 A1 * | 1/2003 | Said | 382/166 |
| 2004/0213469 A1 * | 10/2004 | Apostolopoulos et al. | 382/239 |
| 2005/0002564 A1 * | 1/2005 | Aliffi et al. | 382/166 |
| 2008/0069440 A1 * | 3/2008 | Forutanpour | 382/163 |
| 2008/0152221 A1 * | 6/2008 | Kadatch | 382/166 |
| 2008/0259359 A1 * | 10/2008 | Tamura | 358/1.1 |
| 2008/0267495 A1 | 10/2008 | Shimura | |
| 2010/0329550 A1 * | 12/2010 | Cheatle | 382/165 |
| 2011/0229027 A1 * | 9/2011 | Shibuya | 382/166 |
| 2011/0255777 A1 * | 10/2011 | Matsuoka | 382/164 |
| 2012/0008861 A1 * | 1/2012 | Narita | 382/166 |
| 2012/0014597 A1 * | 1/2012 | Matsunaga | 382/166 |
| 2012/0250991 A1 * | 10/2012 | Okada et al. | 382/166 |
| 2014/0009576 A1 * | 1/2014 | Hadzic et al. | 348/43 |
| 2014/0093166 A1 * | 4/2014 | Okada et al. | 382/166 |

OTHER PUBLICATIONS

Larson, G.W., Overcoming gamut and dynamic range limitations in digital images. Proceedings of the Sixth Color Imaging Conference. pp. 214-219, 1998.

* cited by examiner

Primary Examiner — Sean Motsinger

(57) ABSTRACT

Color image data is compressed by determining the number of colors within a cell of an input image, each cell comprising an N×M array of pixels; in response to determining that the number of colors is greater than a first predetermined threshold, compress the cell using lossy compression; and in response to determining that the number of colors is less than the first predetermined threshold, reduce the number of colors.

16 Claims, 7 Drawing Sheets

COLOR IMAGE DATA COMPRESSION

BACKGROUND TO THE INVENTION

Color image data compression is widely used in reducing the data for use with color printers. The color image data is compressed to minimise the data transfer requirements for the printer whilst maintaining image quality and avoiding imaging defects. Many techniques have been developed to compress RGB, most are tuned for images, which preserve too many details that cannot be reproduced by a printing device, and in addition require relatively extensive computation resources. These techniques tend to achieve poor results in compression of high definition graphics. A general purpose compression technique targeted for printing devices should preserve both graphics and images in good quality.

BRIEF DESCRIPTION OF DRAWINGS

For a more complete understanding, reference is now made to the following description taken in conjunction with the accompanying drawings in which.

DETAILED DESCRIPTION

Figure 1:
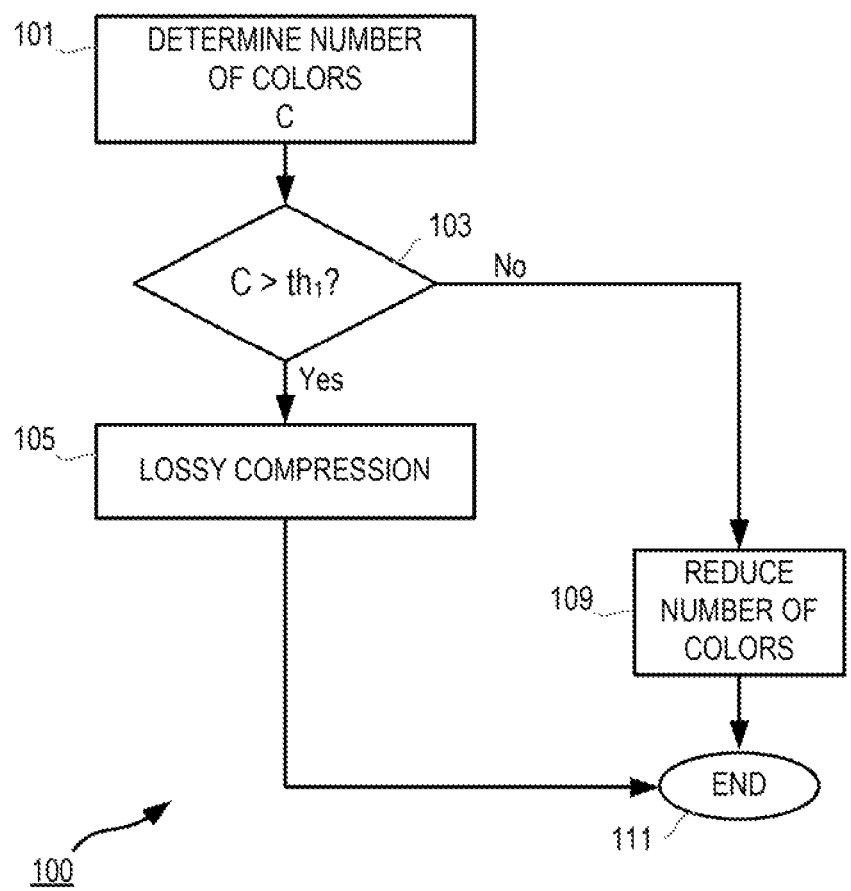
FIG. 1 is a flowchart of an example of a method of compressing color image data

With reference to FIG. 1, the method 100 of compressing color image data comprises determining the number of colors within a cell of an input image, block 101. Each cell comprises an N×M array of pixels. A pixel is an image element. In the specific example of an RGB image, each pixel is coded using a 24 bit format representing (R,G,B) values. In the specific example, N=M=4. Of course any suitable size cell may be utilised.

Next the determined number of colors is compared with a first predetermined threshold value $th_1$, block 103. If the number of colors is greater than the first predetermined threshold $th_1$, then the cell is compressed using a lossy compression algorithm, like for example, color cell compression, block 105. The first predetermined threshold $th_1$ may be less than or equal to the number of pixels (N*M) in a cell, for example, N=M=$th_1$=4. Once the cell is compressed, block 105 is completed, the compression process ends, step 111. The compressed color image is output and forms the basis for encoding the image for storage and/or printing.

Figure 2A:
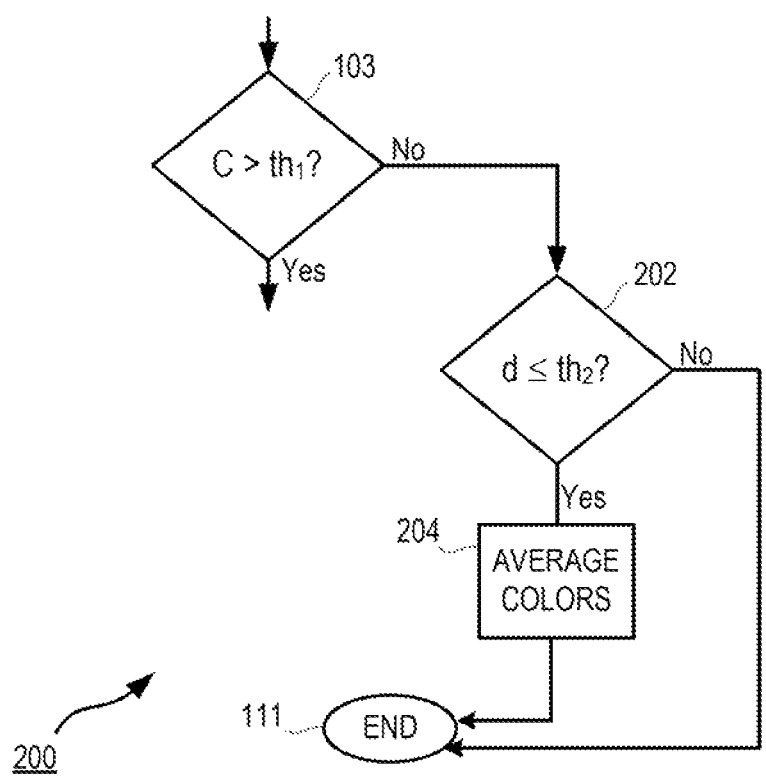
FIG. 2a is a flowchart of an example of reducing the number of colors of the method illustrated in FIG. 1.

If the number of colors is less than or equal to the first predetermined threshold $th_1$, the number of colors is reduced, block 109, or alternatively, the cell is compressed losslessly. One example of reducing the number of colors is illustrated in FIG. 2a. If the number of colors is less than or equal to the first predetermined threshold $th_1$, the difference (distance) between the colors is determined and if the difference (distance) is less than or equal to a second predetermined threshold $th_2$, block 202, the number of colors is reduced, block 204. The distance between the colors may be any distance function (metric) between two pixels. Any metric may be utilised, but in the specific example the Manhattan distance (block distance) metric is used:

$$\text{distance}(a,b) = |R_a - R_b| + |G_a - G_b| + |B_a - B_b|$$

The number colors may be reduced, block 204, by averaging the colors of the pixels that have a distance less than or equal to the second predetermined threshold $th_2$ to combine them into a single color. This may be achieved by clustering the colors of the cell and determining the cluster centre of mass and determining the respective distances of the colors of each color with respect to the determined cluster centre of mass. Once the colors have been reduced, the compression process ends, block 111. The reduced color image is output and forms the basis for encoding the image for storage and/or printing.

If the distance between the colors of the cell is greater than the second predetermined threshold $th_2$, block 107, the compression process ends, block 111. The current colors of the cell are output and form the basis for encoding the image for storage and/or printing.

Figure 3:
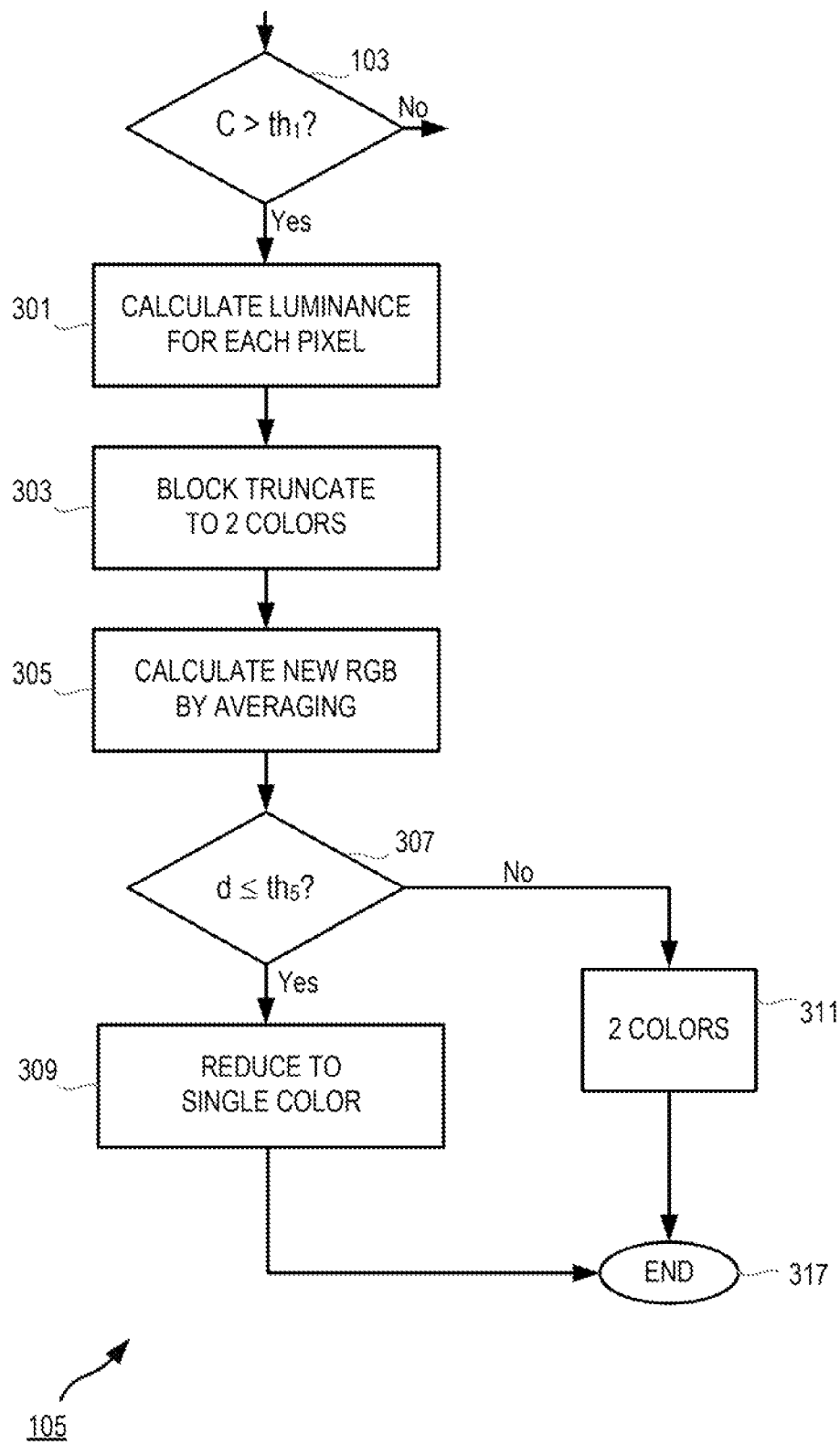
FIG. 3 is a flowchart of an example of the block of compressing the cell of the method of FIG. 1.

If, in a specific example, the basic cell is 4×4 pixels; each pixel is an RGB color. It is considered that graphic features of an image within such a cell are unlikely to have more than 4 colors, and even if more than 4 colors do exist, they would be impossible to reproduce by known printing techniques. Therefore, any 4×4 cell which contains more than 4 RGB colors, i.e. the number of colors exceed the first predetermined threshold $th_1$ is regarded as an image, and is thus lossy compressed, block 105, and as illustrated in FIG. 3. The lossy compression compresses the colors of the 4×4 cell into either 1 or 2 RGB colors.

Figure 2B:
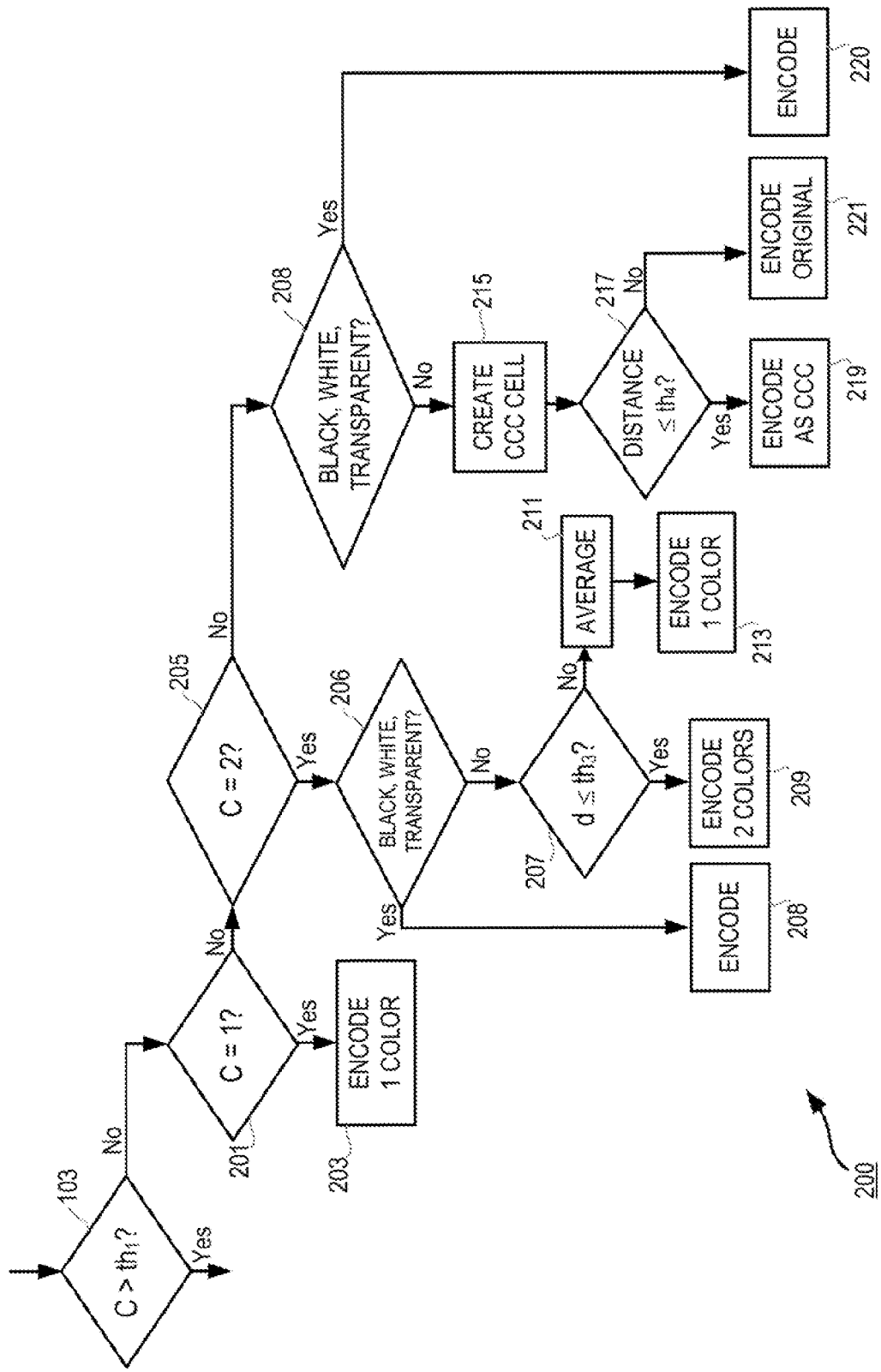
FIG. 2b is a flowchart of an alternative example of reducing the number of colors of the method illustrated in FIG. 1.

Alternatively, as shown in FIG. 2b, if in block 103 of FIG. 1, if the number of colors is determined to be less than or equal to the first predetermined threshold $th_1$, and the number of colors C is 1, block 201, the compression process ends and the one color is encoded, block 203.

If the number of colors, C is determined to be 2, and if either color is black, white or transparent, block 206, then the compression process ends and the two colors are encoded, block 209. If either color is not black, white or transparent, block 206, the distance between the colors is determined, block 207, and if the distance is less or equal to than a third predetermined threshold $th_3$, the 2 colors are combined into a single color by averaging the colors, block 211. The single combined color is then output and the compression process ends and the one color is encoded, block 213. If the distance is greater than the third predetermined threshold $th_3$ then the compression process ends and the two colors are encoded, block 209.

If the number of colors C is greater than 2 but less than or equal to the first predetermined threshold $th_1$, and if the colors are black, white and transparent, then the compression process ends and the original number of colors are encoded, block 220. If at least one of the color is not black, white or transparent, a color cell compression (CCC) cell is created, block 215, by applying the color cell compression algorithm to the cell as described below with reference to FIG. 3.

If all distances between the original cell and the CCC cell are less than or equal to a fourth threshold $th_4$, block 217, then the compression process ends and the cell is encoded as the CCC cell, block 219. Otherwise, it is encoded as the original cell, block 221.

As illustrated in FIG. 3, the lossy compression comprises calculating the luminance of each pixel of the cell, block 301. The cell is then block truncated into 2 colors according to the calculated luminance channel and its truncation into 2 gray levels, block 303. New RGB values for the 2 colors are calculated by averaging, block 305. Up to this point it is the original color cell compression. Next another quantization process is applied to further reduce data. This is achieved by comparing the distance between the 2 colors, block 307. If the distance between the 2 colors is less than or equal to the fifth predetermined threshold $th_5$, the 2 colors are reduced to a single color by averaging, block 309. Otherwise, the cell is preserved with 2 colors.

Further, each pixel of each cell may be classified as transparent, white, black, gray or color. Transparent, white, black and gray pixels are coded using pre-existing codes. Transparent, white and black requires a single code with no additional data, gray requires an additional byte. Color requires additional 3 bytes.

The cell may be further compressed by giving shorter codes to the common black, white, transparent and gray pixels.

RGB data streams may be yet further compressed by using run-length encoding over sequences of identical cells.

The Lossy-ness can be further controlled by changing the value of the second, third, fourth and fifth predetermined thresholds, for example, increasing the second, third, fourth and fifth predetermined threshold levels results in more RGB colors being merged into fewer colors (more lossy-ness). Controlling lossy-ness may be important where size and bandwidth are critical or the application allows more lossy-ness. As an example: compression of images can be safely done with limitation to produce up to 2 RGB colors per cell.

For encoding the pixels of an image, an RGB color may be one of the following kinds:
 0. Transparent
 1. White—(r,g,b)=(1,1,1)
 2. Black—(r,g,b)=(0,0,0)
 3. Gray—r=g=b
 4. RGB An RGB cell may contain up to 4 colors:
Up to one color of Transparent, White and Black
Up to four colors of Gray and RGB.
RGB cell is encoded using the following fields:
 1. Number of colors
 2. Colors combination code
 3. Vector Number of colors per cell can be 1-4, 2 bits are used to encode the number of participating colors as 4-number of colors.

There are 28 possible color combinations stored using 5 bits. The following tables describe possible cell codes:

TABLE 1

Color Codes

| Color Code | Color |
|---|---|
| 0 | Transparent |
| 1 | White |
| 2 | Black |
| 3 | Gray |
| 4 | RGB |

TABLE 2

RGB Cell Codes

| Code | Colors |
|---|---|
| 0x00 | 0123 |
| 0x01 | 0124 |
| 0x02 | 0133 |
| 0x03 | 0134 |
| 0x04 | 0144 |
| 0x05 | 0233 |
| 0x06 | 0234 |
| 0x07 | 0244 |
| 0x08 | 0333 |
| 0x09 | 0334 |
| 0x0a | 0344 |
| 0x0b | 0444 |
| 0x0c | 1233 |
| 0x0d | 1234 |
| 0x0e | 1244 |
| 0x0f | 1333 |
| 0x10 | 1334 |
| 0x11 | 1344 |
| 0x12 | 1444 |
| 0x13 | 2333 |
| 0x14 | 2334 |
| 0x15 | 2344 |
| 0x16 | 2444 |
| 0x17 | 3333 |
| 0x18 | 3334 |
| 0x19 | 3344 |
| 0x1a | 3444 |
| 0x1b | 4444 |

C7-0
  C6 . . . C5 holds the number of colors n=4-C(6 . . . 5)
  C4 . . . C0 holds the color combination in the following way:
0—A transparent pixel—up to 1 in a cell, no need for a value
1—A White pixel—up to 1 in a cell, no need for a value
2—A Black pixel—up to 1 in a cell, no need for a value
3—A Gray pixel—up to 4 in a cell, 1 byte is needed to store value
4—An RGB pixel—up to 4 in a cell, 3 bytes are needed to store value
Code 0=0x00=0123
Code 1=0x01=0124
Code 2=0x02=0133
Code 3=0x03=0134
Code 4=0x04=0144
Code 5=0x05=0233
Code 6=0x06=0234
Code 7=0x07=0244
Code 8=0x08=0333
Code 9=0x09=0334
Code 10=0x0a=0344
Code 11=0x0b=0444
Code 12=0x0c=1233
Code 13=0x0d=1234
Code 14=0x0e=1244
Code 15=0x0f=1333
Code 16=0x10=1334
Code 17=0x11=1344
Code 18=0x12=1444
Code 19=0x13=2333
Code 20=0x14=2334
Code 21=0x15=2344
Code 22=0x16=2444
Code 23=0x17=3333
Code 24=0x18=3334
Code 25=0x19=3344

Code 26=0x1a=3444
Code 27=0x1b=4444
eg. 01110000=>4-3=1 colors+16=>WHITE
eg. 01010001=>4-2=2 colors+17=>WHITE+GRAY. The Gray value should follow.
eg. 00001101=>4-0=4 colors+13=>WHITE+BLACK+GRAY+RGB. The Gray and RGB values should occupy the next 4 bytes.

Figure 4:
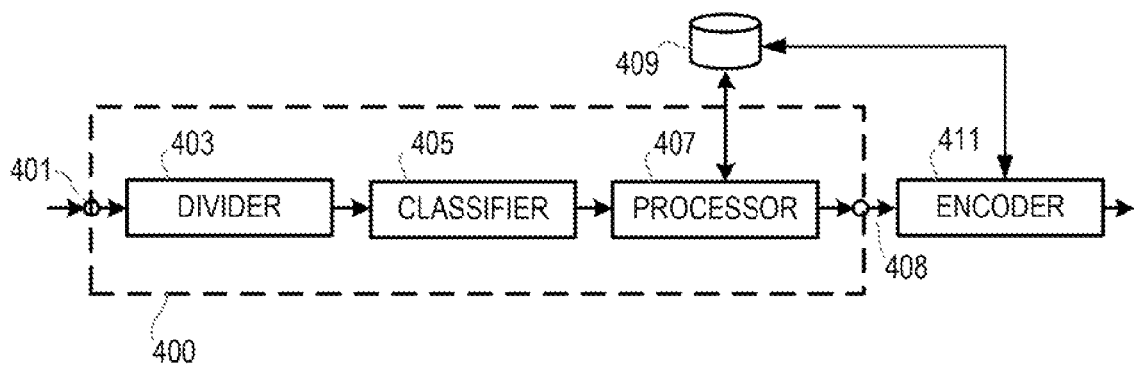
FIG. 4 is a simplified schematic of an example of apparatus for compressing color image data.

An example of apparatus for compressing color image data is illustrated in FIG. 4. The apparatus 400 comprises an input terminal 401 for receiving a RGB image data stream. The input terminal 401 is connected to a divider 403 for dividing the array of pixels of the image into a plurality (n) of N×M array of pixels or cells. The output of the divider 403 is connected to the input of a classifier 405 for classifying each pixel of the image as transparent, white, black, gray or color. The output of the classifier is connected to the input of a processor 407. The processor may be connected to a storage device 409. The processor 407 is configured to determine the number of colors within a cell of an input image, each cell comprising an N×M array of pixels; in response to determining that the number of colors is greater than a first predetermined threshold, compress the cell using lossy compression; in response to determining that the number of colors is less than the first predetermined threshold, reduce the number of colors. The output of the processor 407 is connected to an output terminal 408. The output terminal 408 provides the output of the compression process which may be provided to an encoder 411 which may be in communication with the storage device 409. The encoder encodes the pixels according to the compression of the colors using codes stored in the storage device 409. The storage device 409 may be utilised to store the final encoded, compressed data or the encoded data may be utilised by a printer to print the compressed image.

As illustrated in table 3 below, the method of the examples of FIGS. 1 to 3 was tested on a set of 21 images, 0.tif, 1.tif, 2.tif . . . 20.tif containing a wide variety of graphics, natural images and test features. The images were sent to a CMYK-based printer, and the raster output in CMYK of the printer was captured at machine resolution of 32 dpmm. It was then converted to RGB and processed using a matrix of distance values for $th_2$, $th_3$, $th_4$ and $th_5$ of 0, 10, 20, 50, 100 and of permitted colors of 2 or 4 (i.e. $th_1$). The images were printed on a CMYK-based printer by converting them to CMYK and compressing the cells as described above. After that, they were inspected for artifacts and their compression ratio was captured.

Figure 5:
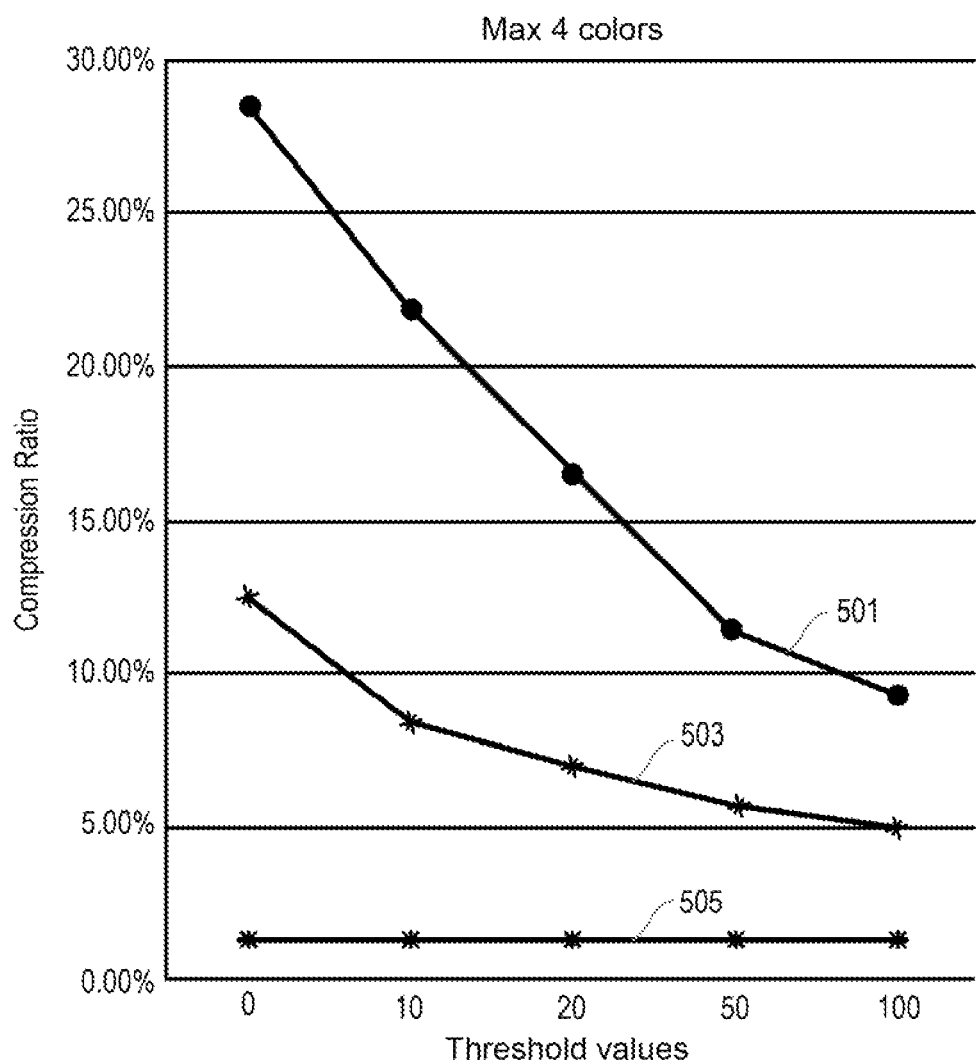
FIG. 5 is a graphical representation of the range of compression ratios achieved by the method illustrated in FIG. 1 with 4 colors allowed.
Figure 6:
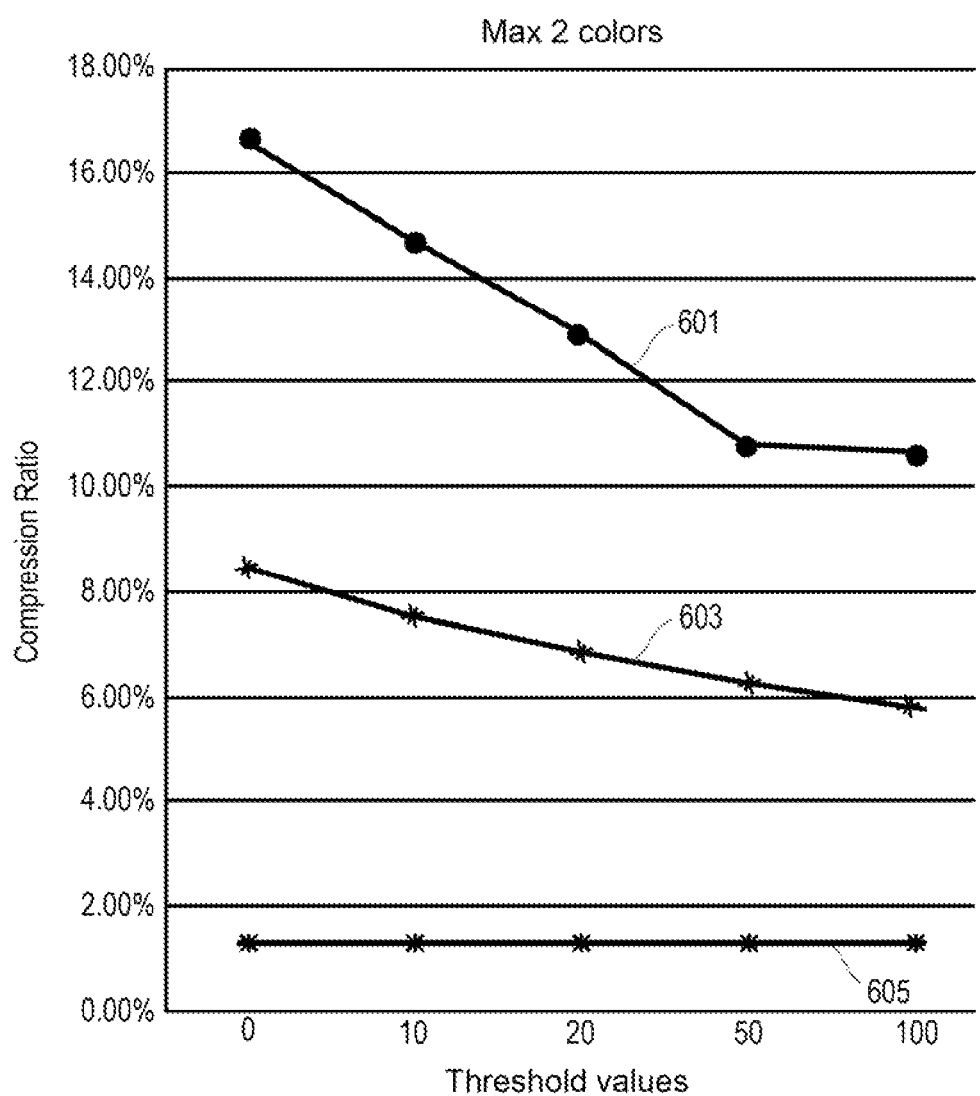
FIG. 6 is a graphical representation of the range of compression ratios achieved by the method illustrated in FIG. 1 with 2 colors allowed.

The best, worst and average values of table 3 below are illustrated graphically for 4 permitted colors in FIG. 5 and for 2 permitted colors in FIG. 6.

TABLE 3

Compression ratio results table

| Image | Max 4 colors | | | | | Max 2 colors | | | | |
|---|---|---|---|---|---|---|---|---|---|---|
| | 0 | 10 | 20 | 50 | 100 | 0 | 10 | 20 | 50 | 100 |
| 10.tif | 28.42% | 19.49% | 15.81% | 11.41% | 9.31% | 16.67% | 14.40% | 12.91% | 10.66% | 9.38% |
| 6.tif | 27.88% | 21.79% | 16.47% | 10.96% | 8.89% | 16.37% | 14.69% | 12.33% | 9.65% | 8.26% |
| 17.tif | 20.13% | 8.53% | 7.11% | 6.61% | 6.47% | 13.05% | 10.36% | 9.56% | 9.24% | 9.14% |
| 4.tif | 16.36% | 6.88% | 5.86% | 5.41% | 5.27% | 12.61% | 10.86% | 10.26% | 9.96% | 9.86% |
| 0.tif | 16.01% | 13.44% | 11.25% | 8.39% | 6.57% | 9.15% | 8.74% | 7.91% | 6.63% | 5.70% |
| 12.tif | 14.81% | 10.49% | 8.23% | 6.10% | 5.30% | 9.56% | 8.44% | 7.34% | 6.09% | 5.58% |
| 20.tif | 14.67% | 10.28% | 9.08% | 8.32% | 8.05% | 12.15% | 11.48% | 11.05% | 10.77% | 10.65% |
| 16.tif | 13.68% | 10.90% | 8.48% | 6.33% | 5.44% | 9.55% | 8.89% | 7.39% | 5.94% | 5.31% |
| 8.tif | 13.65% | 9.49% | 7.76% | 6.13% | 5.41% | 8.84% | 7.97% | 7.26% | 6.49% | 6.10% |
| 11.tif | 13.23% | 8.82% | 6.74% | 4.95% | 4.26% | 7.83% | 6.74% | 5.80% | 4.79% | 4.34% |
| 3.tif | 12.96% | 8.98% | 7.44% | 5.82% | 4.98% | 7.93% | 7.14% | 6.61% | 5.95% | 5.53% |
| 19.tif | 12.85% | 9.08% | 6.95% | 5.07% | 4.34% | 7.85% | 6.85% | 5.86% | 4.81% | 4.33% |
| 5.tif | 9.72% | 6.51% | 6.07% | 5.89% | 5.74% | 7.99% | 7.55% | 7.41% | 7.37% | 7.32% |
| 18.tif | 9.22% | 5.30% | 5.30% | 5.30% | 5.30% | 8.29% | 7.95% | 7.95% | 7.95% | 7.95% |
| 13.tif | 8.32% | 4.84% | 4.73% | 4.67% | 4.66% | 6.86% | 6.48% | 6.44% | 6.41% | 6.40% |
| 7.tif | 7.24% | 5.63% | 4.42% | 3.61% | 3.56% | 4.79% | 4.12% | 3.53% | 3.13% | 3.09% |
| 1.tif | 7.21% | 4.78% | 4.71% | 4.65% | 4.61% | 5.99% | 5.63% | 5.60% | 5.58% | 5.57% |
| 2.tif | 6.34% | 5.28% | 4.46% | 3.73% | 3.23% | 4.11% | 3.90% | 3.62% | 3.39% | 3.20% |
| 9.tif | 4.38% | 3.50% | 2.62% | 1.87% | 1.73% | 3.19% | 2.97% | 2.41% | 1.85% | 1.73% |
| 15.tif | 2.58% | 2.58% | 2.58% | 2.58% | 2.58% | 2.58% | 2.58% | 2.58% | 2.58% | 2.58% |
| 14.tif | 1.34% | 1.26% | 1.25% | 1.24% | 1.23% | 1.28% | 1.27% | 1.26% | 1.26% | 1.25% |
| Best | 1.34% | 1.26% | 1.25% | 1.24% | 1.23% | 1.28% | 1.27% | 1.26% | 1.26% | 1.25% |
| Average | 12.43% | 8.47% | 7.01% | 5.67% | 5.09% | 8.41% | 7.57% | 6.91% | 6.21% | 5.87% |
| Worst | 28.42% | 21.79% | 16.47% | 11.41% | 9.31% | 16.67% | 14.69% | 12.91% | 10.77% | 10.65% |

As illustrated above in table 3 and FIGS. 5 and 6, the compression ratio for 2 permitted colors is much better than 4 permitted colors for small threshold values, but the difference becomes negligible at higher threshold values such as above 20.

No artifacts were noticeable in the images compressed using threshold values under 50. At this distance level (50) compression ratios seems to be below 12%. Therefore, it is shown that the method of the examples above is a very good compression method targeted for printing devices which store or transfer their data in RGB.

As a result, the method of the examples above reliably preserves graphics features and maintaining their color accuracy. The method above is relatively simple from computational point of view, and can easily be parallelized. It provides direct scan access and may be used by page composition systems or for texture compression, allowing for fast compression and decompression, random access into image data and asymmetrical processing effort between encoding and decoding. Therefore, it preserves both natural images and synthetic graphics at the desired quality.

It performs well on all RGB based images, as well as Luminance and Chrominance (YUV, YCbCr, Lab, etc) and Hue and Saturation (HSV, HSL) models.

In addition, it can be easily adapted with only minor changes required to be used for RGBA (alpha channel) compression or for compressing other multi-channel color systems such as YUV and Lab. In RGB, Luminance is calculated by Luminance(R,G,B)=0.229R+0.587G+0.114B. In Lab and Yuv, Luminance is given by the L and Y channels. In RGB, gray is defined as R=G=B. In Lab and Yuv, Gray is defined as a=b=0 and u=v=0. The method described above is then applied using these values.

All "Luminance plus Chrominance" color spaces (Lab, Yuv, YIQ, YDbDr, YCbCr YPbPr, where Luminance it the first channel and Gray is defined as the chrominance channels equal zero may be captured. The same also applies for "Hue and Saturation" spaces (HSV HSL) where V/L is luminance and gray is defined as HS equal zero.

Although various examples have been illustrated in the accompanying drawings and described in the foregoing detailed description, it will be understood that the invention is not limited to the examples disclosed, but is capable of numerous modifications without departing from the scope of the invention as set out in the following claims.

The invention claimed is:

1. A method of compressing color image data, the method comprising:
   determining the number of colors within a cell of an input image, each cell comprising an N×M array of pixels; and
   in response to determining that the number of colors is greater than a first predetermined threshold, compressing the cell using color cell compression, wherein compressing the cell comprises:
      block truncating to two colors of each cell having a number of colors greater than a first predetermined threshold according to the luminance level of each pixel of each cell having a number of colors greater than a first predetermined threshold,
      calculating new color values for the two colors by averaging, and
      in response to determining that the distance between the luminance of the pixels of two colors is greater than a second predetermined threshold and in response to determining that the two colors are not to be preserved, quantizing the two colors by reducing the two colors to a single color:
   in response to determining that the number of colors is less than or equal to the first predetermined threshold, reducing the number of colors.

2. The method according to claim 1, wherein the compressing the cell further comprises, in response to determining that the distance between the luminance of the pixels of two colors is less than or equal to the second predetermined threshold, averaging the luminance of the two colors to a single color.

3. The method according to claim 1, wherein the reducing the number of colors comprises:
   determining the distance among the colors;
   in response to determining that the distance among the colors is less than or equal to a third predetermined threshold distance, averaging the colors to reduce the number of colors.

4. The method according to claim 1, wherein the reducing the number of colors comprises:
   in response to determining that the number of colors of the cell having a number of colors less than the first predetermined threshold is 2, determining the distance between the two colors;
   in response to determining that the distance between the two colors is less than or equal to a third predetermined threshold distance, averaging the two colors to reduce the number of colors to 1;
   in response to determining that the number of colors of the cell having a number of colors less than the first predetermined threshold is greater than 2 but less than or equal to the first predetermined threshold, compressing the cell to create a color cell compression (CCC) cell;
   comparing all distances between the CCC cell and the original cell;
   in response to all distances being less than or equal to a fourth predetermined threshold, using the CCC cell; and
   in response to at least one of the all distances being greater than the fourth predetermined threshold, using the original cell.

5. A method of encoding pixels of an image, the method comprising:
   determining the number of colors within a cell of an input image, each cell comprising an N×M array of pixels;
   in response to determining that the number of colors is greater than a first predetermined threshold, compressing the cell using lossy compression and encoding the pixels of the compressed cell, wherein compressing the cell using lossy compression comprises:
      block truncating to two colors of each cell having a number of colors greater than a first predetermined threshold according to the luminance level of each pixel of each cell having a number of colors greater than a first predetermined threshold,
      calculating new color values for the two colors by averaging, and
      in response to determining that the distance between the luminance of the pixels of two colors is greater than the second predetermined threshold and in response to determining that the two colors are not to be preserved within the block truncated cell, reducing the two colors to a single color and applying 1-ROB code to the block truncated cell:
   in response to determining that the number of colors is less than the first predetermined threshold, reducing the number of colors and encoding the pixels having the reduced number of colors.

6. The method according to claim 5, wherein compressing the cell using lossy compression comprises
   in response to determining that the distance between the luminance of the pixels of two colors of the block truncated cell is less than or equal to the second predetermined threshold, averaging the luminanace of the two colors to a single color;
   in response to determining that the distance between the luminance of the pixels of two colors is greater than the second predetermined threshold and in response to deter fining that the two colors are to be preserved within block truncated cell, applying 2-ROB color codes to the block truncated cell.

7. The method according claim 5, wherein each pixel of each cell is classified as transparent, white, black, gray or color and the method further comprising:
   coding the pixels classified as transparent, white, black or gray using pre-existing codes.

8. The method according to claim 5, wherein the reducing the number of colors comprises:
   determining the distance between the colors;
   in response to determining that the distance between the colors is less than or equal to a third predetermined threshold distance, averaging the colors to reduce the number of colors.

9. The method according to claim 5, wherein the reducing the number of colors comprises:

in response to determining that the number of colors of the cell having a number of colors less than the first predetermined threshold is 2, determining the distance between the two colors;

in response to determining that the distance between the two colors is less than or equal to a third predetermined threshold, averaging the two colors to reduce the number of colors to 1;

in response to determining that the number of colors of the cell having a number of colors less than the first predetermined threshold is greater than 2 but less than or equal to the first predetermined threshold, compressing the cell to create a color cell compression (CCC) cell;

comparing all distances between the CCC cell and the original cell;

in response to all distances being less than or equal to a fourth predetermined threshold, using the CCC cell; and in response to at least one of the all distances being greater than the fourth predetermined threshold distance, using the original cell.

10. An apparatus for compressing color image data, the apparatus comprising:
a processor to:
determine the number of colors within a cell of an input image, each cell comprising an N×M array of pixels; and
in response to a determination that the number of colors is greater than a first predetermined threshold, compress the cell using lossy compression, wherein to compress the cell, the processor is to:
block truncate to two colors of each cell having a number of colors greater than a first predetermined threshold according to the luminance level of each pixel of each cell having a number of colors greater than a first predetermined threshold,
calculate new color values for the two colors by averaging, and
in response to a determination that the distance between the luminance of the pixels of two colors is greater than a second predetermined threshold and in response to a determination that the two colors are not to be preserved, quaritize the two calculated colors to reduce the two colors to a single color;
in response to a determination that the number of colors is less than or equal to the first predetermined threshold, reduce the number of colors.

11. The apparatus according to claim 10, wherein the input image comprises an N×M array of pixels, n being a positive integer, and the apparatus is to divide an image, into n cells of N×M array of pixels.

12. The apparatus according to claim 10, wherein the apparatus is to classify each pixel of the input image as transparent, white, black, gray or color.

13. An apparatus for encoding pixels of an image, the apparatus comprising:
a processor;
a memory on which is stored machine readable instructions that are to cause the processor to:
determine the number of colors within a cell of an input image, each cell comprising an N×M array of pixels;
in response to a determination that the number of colors is greater than a first predetermined threshold, compress the cell using lossy compression and encode the pixels of the compressed cell, wherein to compress the cell using lossy compression, the processor is to:
block truncate to two colors of each cell having a number of colors greater than a first predetermined threshold according to the luminance level of each pixel of each cell having a number of colors greater than a first predetermined threshold,
calculate new color values for the two colors by averaging, and
in response to a determination that the distance between the luminance of the pixels of two colors is greater than a second predetermined threshold and in response to a determination that the two colors are not to be preserved, reduce the two colors to a single color:
in response to a determination that the number of colors is less than or equal to the first predetermined threshold, reduce the number of colors and encode the pixels having the reduced number of colors.

14. A non-transitory computer-readable medium comprising computer executable code for compressing color image data, the computer executable code comprising instructions that when executed by a processor are to cause the processor to:
determine the number of colors within a cell of an input image, each cell comprising an N×M array of pixels; and
compress the cell using lossy compression in response to a determination that the number of colors is greater than a first predetermined threshold, wherein to compress the cell, the instructions are to cause the processor to
block truncate to two colors of each cell having a number of colors greater than a first predetermined threshold according to the luminance level of each pixel of each cell having a number of colors greater than a first predetermined threshold,
calculate new color values for the two colors by averaging, and
in response to a determination that the distance between the luminance of the pixels of two colors is greater than a second predetermined threshold and in response to a determination that the two colors are not to be preserved, reduce the two colors to a single color;
reduce the number of colors in response to a determination that the number of colors is less than or equal to the first predetermined threshold.

15. A non-transitory computer-readable medium comprising computer executable code for encoding pixels of an image, the computer executable code comprising instructions that when executed by a processor are to cause the processor to:
determine the number of colors within a cell of an input image, each cell comprising an N×M array of pixels; and
compress the cell using lossy compression and encoding the pixels of the compressed cell in response to determining that the number of colors is greater than a first predetermined threshold, wherein to compress the cell using lossy compression, the instructions are to cause the processor to:
block truncate to two colors of each cell having a number first predetermined threshold according to the luminance level of each pixel of each cell having a number of colors greater than a first predetermined threshold,
calculate new color values for the two colors by averaging, and
in response to a determination that the distance between the luminance of the pixels of two colors is greater than a second predetermined threshold and in response to a determination that the two colors are not to be preserved, reduce the two colors to a single color;

reduce the number of colors and encode the pixels having the reduced number of colors in response to a determination that the number of colors is less than the first predetermined threshold.

16. The method according to claim 2, wherein averaging the luminances of the two colors to a single color comprises encoding the averaged luminances of two colors as an encoding of the single color.

* * * * *